Feb. 7, 1967 J. A. KOLLING 3,303,355

OR-INVERTER

Filed June 27, 1963 2 Sheets-Sheet 1

INVENTOR.
JOHN A. KOLLING

BY Vincent L. Carney
D. E. Hodges
ATTYS.

INVENTOR.
JOHN A. KOLLING
BY Vincent L. Carney
O. C. Hodges
ATTYS.

3,303,355

OR-INVERTER

John A. Kolling, St. Paul, Minn., assignor, by mesne assignments, to the United States of America as represented by the Secretary of the Navy Filed June 27, 1963, Ser. No. 291,213
13 Claims. (Cl. 307—88.5)

This invention relates to logic circuits and more particularly relates to very high speed logic circuits.

It is very desirable that computers and data processing equipment operate as fast as possible. Therefore, it is necessary for the individual components to operate very rapidly. One basic component used in computers and data processing equipment is called a saturating OR-inverter or an AND-NOT circuit. This type of circuit usually has a plurality of input terminals and one output terminal. As a voltage pulse is applied to any one of the input circuits it is inverted and appears at the output circuit. Accordingly it is an object of this invention to provide an improved OR-inverter circuit.

It is a further object of this invention to provide an OR-inverter type of circuit which will provide switching operation in the 100-mc./sec. (megacycle per second) region.

It is a further object of this invention to provide an OR-inverter circuit with extended fan-in and fan-out capabilities.

It is a still further object of this invention to provide an OR-inverter circuit which will operate with microwave transmission lines and provide proper termination to these lines when switching in either the positive or the negative directions.

It is a still further object of this invention to provide an OR-inverter circuit in which a reactive load will not cause improper switching action to take place.

Other objects and many of the attendant advantages of this invention will be readily appreciated as the same becomes better understood by reference to the following detailed description when considered in connection with the accompanying drawings wherein.

Figure 1:
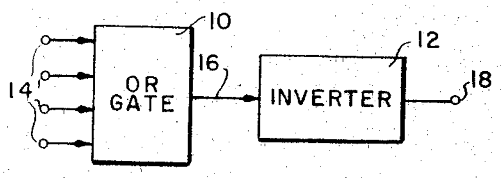
FIG. 1 is a schematic block diagram of a circuit which is an embodiment of the invention.

Referring now in particular to FIG. 1 a block diagram of the invention is shown having an OR gate 10 and an inverter 12. A plurality of input terminals 14 are adapted to receive logic input pulses at a high frequency through transmission lines. If there are no input voltages on any of the terminals 14 or if the terminals 14 are grounded the OR gate 10 to which each of the terminals are independently connected will provide a positive output voltage to the inverter 12 through the conductor 16 which connects the OR gate 10 to the inverter 12. In response to this positive voltage on conductor 16 the inverter 12 will provide a voltage of approximately a negative 2 volts on the output terminal 18 which is connected to the inverter 12.

When a negative voltage of approximately 2 volts is applied to any of the terminals 14 or to all of the terminals 14 leading to the OR gate 10, the OR gate 10 provides a negative voltage of approximately 1.2 volts to the conductor 16 which connects the OR gate 10 to the inverter 12. The inverter 12 will provide a positive voltage to the output terminal 18, which is very close to ground level, in response to this negative input voltage.

Figure 2:
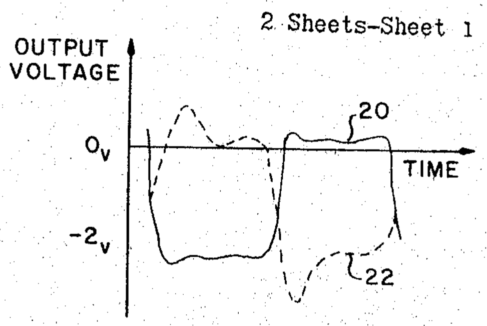
FIG. 2 is a graph of the input and output voltages of a circuit which is an embodiment of this invention.

A graph of the input voltages to the terminals 14 and of the output voltages which respond to these input voltages is shown in FIG. 2 in which the solid line 20 represents the input voltage and the dotted line 22 represents the output voltages. The abscissa of this graph is indicative of the various voltages and the ordinate is indicative of time. When the input voltage, as shown on the solid line 20, is at approximately a negative 2 volts, the output voltage is only slightly above ground, and when the input voltage is close to ground, the output voltages are at approximately a negative 2 volts.

Figure 3:
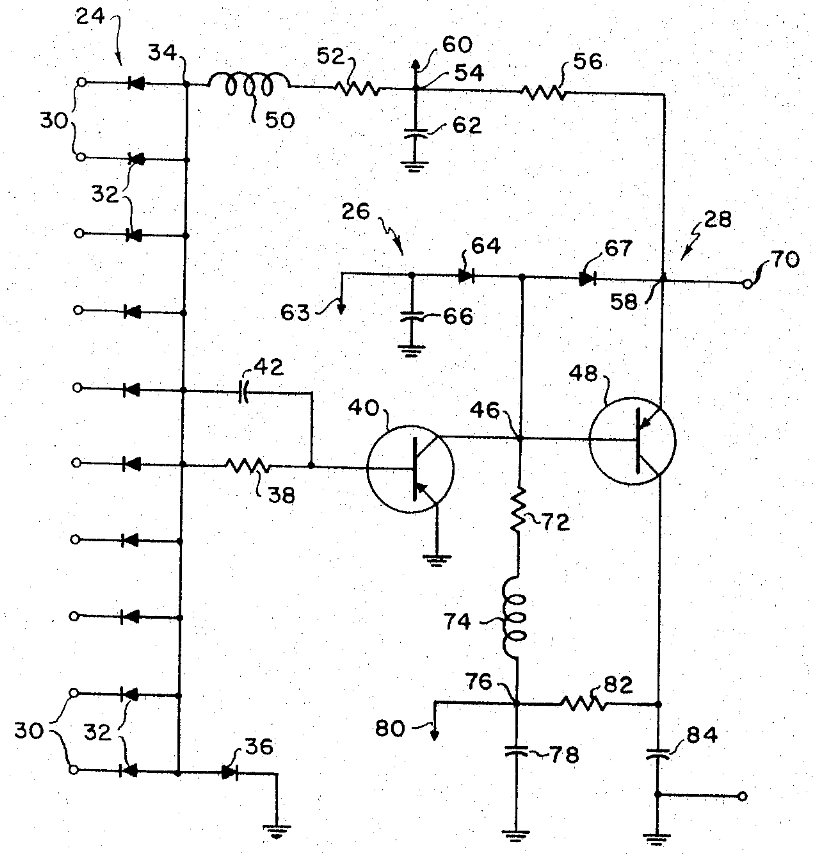
FIG. 3 is a schematic circuit diagram of one embodiment of the invention.

A detailed schematic circuit diagram of the embodiment of the invention is shown in FIG. 3, having an OR gate section 24 and an inverter section 26 and an output amplifier section 28. A plurality of input terminals 30, adapted to be connected to the transmission lines leading from other components of the computer or data processing machines, are each connected to the cathode of diodes 32. The anodes of the diodes 32 are connected to the common electrical point 34. In this embodiment of the invention ten terminals 30 and ten diodes 32 may be used to provide a fan-in of 10. The diodes 32 may be of the type Fairchild Semiconductor FS–100, which have a reverse recovery time of 2 to 4 nsec. (nanoseconds) under standard test conditions. An eleventh diode 36 of the same type as the diodes 32 has its anode connected to the electrical point 34 and its cathode grounded.

A 330 ohm resistor 38 is connected at one end to the common electrical point 34 and at the other end to the base of PNP transistor 40 of the type 2N769. A 47 pf. (picofarad) capacitor 42 has one end connected to the common electrical point 34 and the other end to the base of the transistor 40 so as to be in parallel with the 330 ohm resistor 38. The emitter of transistor 40 is grounded and its collector is connected to terminal 46. The base of transistor 48 is also connected to terminal 46. Transistor 48 is a Texas Instruments PNP transistor of the type S501, which has a low-collector saturation-resistance as in the emitter-follower.

The input impedance to the transistor 40 resembles a parallel resistance and capacitance. The total impedance of the input circuit includes the transistor 40 impedances, capacitor 42 and resistance 38. The time constant afforded by the set of impedances is made equal to the time constant afforded by inductance 50 and resistance 52. The direct current impedances are such that the current in the circuit branch 50–52 is equal to and opposite to that through the resistance 38. When the transistor 40 is turned on, energy is stored in the inductance 50 and capacitance 42 for aiding in turning off the transistor when the diodes are reverse biased.

One microhenry inductor 50, 680 ohm resistor 52, terminal 54, 1 kilo-ohm resistor 56, terminal 58, and the emitter of PNP transistor 48 are connected in series in the named order between the common electrical point 34, which is connected to the inductor 50, and the emitter of transistor 48. The positive terminal of the 4 volt voltage source 60 is connected to terminal 54. This voltage source has a variation of less than plus or minus 5%. One end of 25 microfarad capacitor 62 is connected to the terminal 54 and the other end is grounded. A source of a negative 2 volts 63 which has a variation of less than plus or minus 5% is connected to the anode of diode 64 and to one end of the capacitor 66. The other end of the capacitor 56 is grounded. This capacitor has a value of 40 microfarads.

The cathode of diode 64 is connected to the anode of diode 67 and to terminal 46. The cathode of diode 67 and the output terminal 70 of the OR inverter are each electrically connected to the terminal 58. The 220 ohm resistor 72, the 47 microhenry inductor 74, terminal 76, and the 25 microfarad capacitor 78 are each electrically connected in series in the order named between the terminal 46, which is connected to the resistor 72, and ground, which is connected to the capacitor 78. A source of negative 4 volts 80 which has a variation of less than plus or minus 5% is also connected to the terminal 76. A 10 ohm resistor 82 is electrically connected between the terminal 76 and the collector of the PNP transistor 48. One end of the 2500 pf. capacitor 84 is connected to the collector of transistor 48 and the other end is grounded. A source of clock pluses may be connected to the cathode of diode 36 rather than ground if desired.

The nominal input voltages to the terminals 30 during operation of the OR inverter are zero and a negative 2 volts. The input switching region is between a negative 0.7 volt and a negative 1.3 volts. With all of the input diodes grounded, the bias current from the 4 volt supply 60 divides approximately equally between all the diodes 32 and the common point 34 is approximately a positive 0.6 volt. Therefore, the transistor 40 is reversed biased and cutoff. When one or more of the inputs to the terminals 30 is negative 2 volts, the drop across these input diodes is about 0.8 volt, so that the common point 34 is at approximately a negative 1.2 volts, or about 2.1 ma. (milliamperes) of base current are flowing in the base of the PNP transistor 40. The remaining grounded diodes are reversed biased.

During an input voltage transition from 0 to a negative 2 volts, stray-capacity charge current, grounded-diode reverse-recovery current, and transistor turn-on charge current are removed through the low forward resistance of the "on" diode (24 plus or minus 9 ohms) and the low driving point resistance (about 10 ohms) resulting in a very fast voltage transition at the common point 34, and a rapid turn-on of the PNP transistor 40. The inductor 50 slows down the increase in bias current through the resistor 52, providing a time constant of 1.5 nsec., to aid the transition.

During an input voltage transition from a negative 2 volts to zero volts, stray capacity charge and transistor turn-off charge must be replaced very rapidly. This replacement is accomplished by the choice of the FD100 as the input diode, with a reverse recovery time of 2 to 4 nsec. under standard test conditions, rather than by using one of the much faster available diodes. This slower recovery allows stray-capacity charge current to flow into the common point 34 through the input diode 32 as it becomes reversed biased. The inductor 50 also slows the decrease of the positive bias current through resistor 52 from its higher steady-state value (approximately 7 ma.) after the voltage at the common point 34 starts rising towards a positive 0.6 volt.

Figure 4:
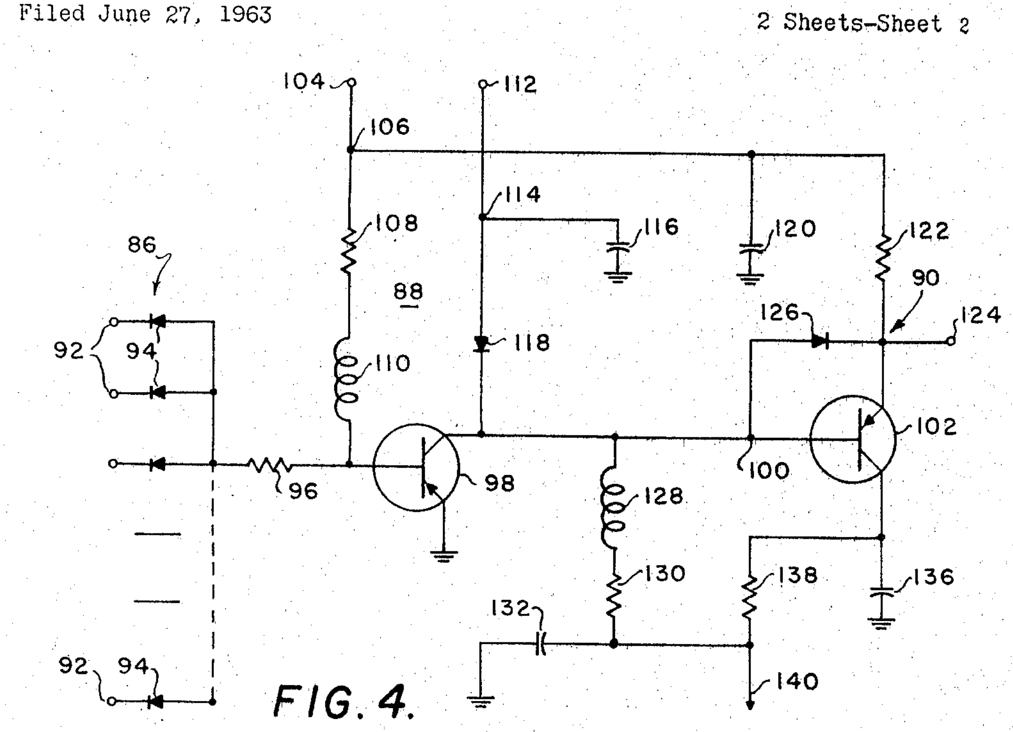
FIG. 4 is a schematic circuit diagram of another embodiment of the invention.

A schematic circuit diagram of another embodiment of the invention is shown in FIG. 4 having an OR-gate 86, an inverter 88 and an output amplifier 90. This circuit has greater fan out, improved rise, improved fall, improved delay, and improved storage time. Fan out has been increased from 5 to 8 and the rise, fall, delay, and storage time have been decreased as much as 50% in some cases.

A pularity of input terminals 92 adapted to receive logic input pulses on transmission lines from other computer components are electrically connected to the cathodes of a plurality of input diodes 94. The diodes are of the type FD176. The anodes of the diodes 94 are each connected to one end of the 68.1 ohm resistor 96; the other end of the resistor 96 is connected to the base of PNP transistor 98 which is of the type 2N769. The emitter of the PNP transistor 98 is grounded and its collector is connected to terminal 100. The base of PNP transistor 102 which is of the type 2N828 is connected to terminal 100. Transistor 102 is an epitaxial version of the transistor type 2N705 and provides a higher maximum output current with a slightly beter frequency response than the transistor type S501A which was used in the embodiment of FIG. 3.

The positive 1 volt voltage source 104 is connected to terminal 106. The voltage source 104 varies less than plus or minus 5%. One end of 169 ohm resistor 108 is connected to terminal 106 and the other end is connected to the 0.47 microhenry inductor 110. The other end of the inductor 110 is connected to the base of transistor 98. The negative voltage source 112 which has a value of 2.5 volts with a variation of less than plus or minus 2% is electrically connected to the terminal 114. One end of 40 microfarad capacitor 116 is connected to terminal 114, the other end is grounded. The anode of diode 118 which is of the type ED2015 is connected to terminal 114 and the cathode of diode 118 is connected to the collector of transistor 98.

One end of 40 microfarad capacitor 120 is connected to terminal 106 and the other end is grounded. Also one end of 330 ohm resistor 122 is connected to terminal 106 and the other end is connected to the emitter of PNP transistor 102. The output terminal 124 of this embodiment of an OR inverter is also connected to the emitter of transistor 102 as is the cathode of diode 126 which is of the type CR11570. The anode of diode 126 is connected to terminal 100. Inductor 128 which has a value of 0.47 microhenry, 221 ohm resistor 130 and 25 microfarad capacitor 132 are each electrically connected in series in the order named with the inductor 108 connected to terminal 100 and with the capacitor 132 grounded.

The collector of PNP transistor 102 is connected to one side of 2500 pf. capacitor 136 and also to one end of the 10 ohm resistor 138. The other end of the capacitor 136 is grounded. The other end of the 10 ohm resistor 138 is connected to a negative 4 volt source 140 which has a variation of less than plus or minus 5%. The electrical connection between resistor 130 and capacitor 132 is also connected to the negative 4 volt voltage source 140.

The embodiment of FIG. 4 operates substantially the same manner as the embodiment of FIG. 3. However, the input circuit is modified. The speed up capacitor is removed, the turn-off bias circuit is moved to the base of the transistor 98, and new component values have been chosen for this new arrangement. This eliminates the peak current surge at the input which was 2 to 3 times the steady state input current of 10 ma. in the old circuit. This modification also improves the ratio of overdrive base current to steady state base current, and decreases rise, fall, delay, and storage times.

Figures 5, 6:
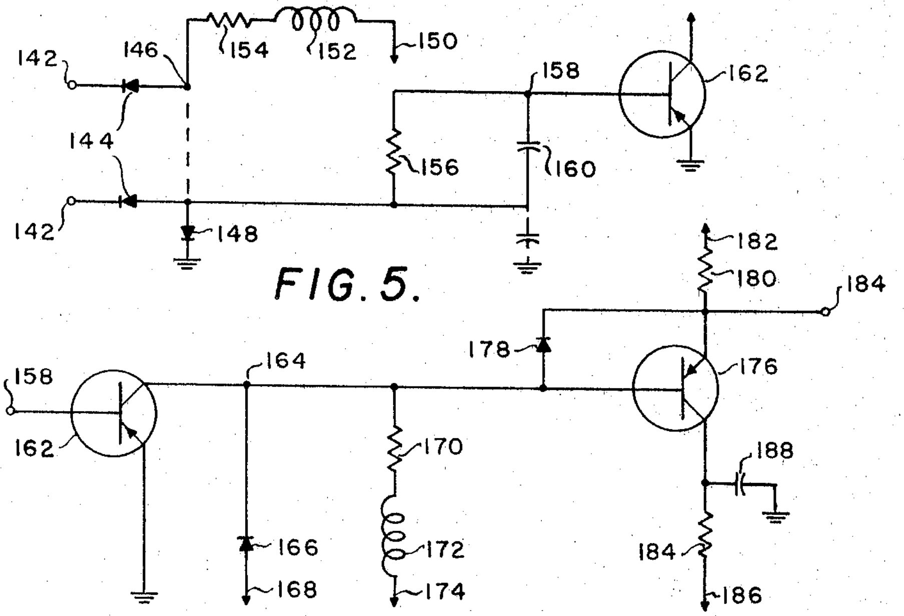
FIG. 5 is a simplified schematic circuit diagram of the input portion of an embodiment of the invention.
FIG. 6 is a simplified schematic diagram of the output portion of an embodiment of the invention.

A simplified schematic circuit diagram of the input circuit is shown in FIG. 5. Input terminals 142, adapted to be connected to transmission lines leading from the output of other logic components in the computer or data processing equipment, are connected to the cathodes of diodes 144. The anode of diodes 144 are connected to the common electrical point 146. The anode of diode 148 is also connected to the common electrical point 146 and its cathode is grounded. The positive 4 volt voltage source 150, the 1 microhenry inductor 152 and the 680 ohm resistor 154 are electrically connected in series in the order named between the voltage source 150 and the common electrical point 146. The 330 ohm resistor 156 is connected at one end to the common electrical point 146 and at the other end the terminal 158. One end of the capacitor 160 which has a value of 47 pf. is connected to the terminal 158 and the other end is connected to the common electrical point 146 so that it is in parallel with resistor 156. The base of the PNP transistor 162 which is of the type 2N769 is connected to the terminal 158 and its emitter is grounded. The collector of the transistor 162 goes to the output circuit.

Fan-in is provided in this circuit by current-biased silicon diodes 144 of the type Fairchild semiconductor, FD1000, used as negative OR-gates. For a fan-in of (N), the input circuit contains (N+1) diodes. (N) of the diodes may be either connected to outputs or left hanging unconnected. The (N+1)th diode must either be grounded at circuit ground or connected to a clock pulse. This diode limits the reverse-biased base voltage to a safe level should all inputs be disconnected.

The nominal input voltages are either zero or a negative 2 volts, and the input switching region is between a negative 0.7 and a negative 1.3 volts. With all input diodes grounded, the bias current from the positive 4.0 volts supply divides approximately equally between all the diodes and the common point 146 is at approximately a positive 0.6 volt. Therefore, the transistor 162 is reversed biased and cutoff. When one or more of the inputs is a negative 2.0 volts, the drop across the input diode 144 is about 0.8 volt, so that the common point 146 is at approximately a negative 1.2 volts or about 2.1 milliamperes of base current flowing in the base of transistor 162. The remaining grounded diodes are reversed biased.

During an input voltage transition from 0 to a negative 2 volts, stray-capacity charge current, grounded diode reverse recovery current, and transistor turn-on charge current are removed through the low foward resistance fom the "on" diode (24 plus or minus 9 ohms) and the load driving point resistance (about 10 ohms) resulting in a very fast voltage transition at the common point 146 and the rapid turn-on of transistor 162.

A simplified schematic circuit diagram of the output portion of the circuit is shown in FIG. 6. Fan-out is obtained through the use of a PNP transistor of the type S501 which is a Texas Instruments Transistor having a low-collector saturation-resistance. This transistor is connected as an emitter follower. The terminal 158 and the transistor 162 are shown as in the input circuit of FIG. 5. The collector of the transistor 162 is connected to terminal 164. The diode 166 has its anode connected to a negative 2 volts source of voltage 168 and has its cathode connected to the terminal 164. One end of 220 ohm resistor 170 is connected to terminal 164 and the other end is connected to 0.7 pf. inductor 172. The other end of inductor 172 is connected to the negative 4 volt voltage supply 174.

The base of transistor 176 which is a PNP transistor of the type S501 is also connected to terminal 164. The anode of diode 178 is connected to the terminal 164 and the cathode is connected to the emitter of the transistor 176. One end of the 1 kilohm resistor 180 is connected to the positive 4 volt D.C. voltage supply 182 and the other end is connected to the emitter of transistor 176 and to the output terminal 184 of the OR inverter. The collector of transistor 176 is connected to one of 10 ohm resistor 184 and the other end of resistor 184 is connected to a negative 4 volts D.C. voltage supply 186. 2500 pf. capacitor 188 is connected to the collector of transistor 176 and the other end is grounded.

Fan-out is obtained through the use of the S501, Texas Instruments transistor, which is a low-collector saturation-resistance version of the 2N705 transistor connected as an emitter-follower. This is a PNP transistor which has a polarity such as to give current amplification during transitions from zero to a negative 2.0 volts at the output. If the output is capacitivity loaded the transistor 176 can become reversed biased and cut off during transition from negative 2.0 volts to zero volts. Therefore, the diode 178 is added to allow this capacitance discharge current to flow out of the terminal 184 through the saturated emitter-to-collector path of transisor 162. The resisor 180 prevents the possibility of the emitter current of transistor 176 dropping to zero (cut off) during steady-state zero-voltage outputs.

During either zero or a negative 2.0 volts steady-state conditions, current normally flows through the terminal 184 of the output. Therefore, the emitter-base voltage drop of the transistor 176 offsets the saturation voltage drop of the transistor 162 and the voltage drop across the diode 166 in clamp to give off a normal zero to a negative 2.0 voltage swing at the output rather than a negative 0.3 volt to a negative 2.3 voltage swing as at the collector of the transistor 162.

With the components and package used in the current state of development of the circuit, the fan-in goal of 10 is easily realizable and has a neglible effect on wave form. However, as the transient current load per input is 2 to 3 times the maximum steady-state, current fan-out appears to be limited to 5.

This invention provides an improved OR Inverter, which will operate in the 100 mc./sec. region. This circuit will provide proper termination to microwave transmission lines when the inputs are moving in either the positive or the negative direction and will provide fan-in and fan-out of between 5 and 8.

Obviously many modifications and variations of the present invention are possible in the light of the above teachings. It is therefore to be understood that within the scope of the appended claims this invention may be practiced otherwise than as specifically described.

I claim:

1. A high speed saturating OR-inverter circuit comprising:
   an OR-gate network;
   an inverter network connected to said OR-gate network; and
   an output network connected to said inverter network;
   said OR-gate network comprising:
   a plurality of switching devices each having a first and a second terminal;
   said first terminals being connected to transmission lines carrying logic voltage pulses;
   said switching devices being connected in common at their respective second terminals at a junction point;
   said inverter network comprising:
   a switching device having first, second and third electrodes;
   said first electrode being connected to said junction point through a first energy-storing network;
   said third electrode being connected thru a two terminal switching device to a source of voltage potential;
   said output network comprising:
   an amplifying device having first, second and third electrodes;
   said third electrode of said switching device being connected to said first electrode of said amplifying device;
   a second energy-storing network connected between said junction point and a source of voltage potential, the second electrode of said amplifying device being connected to said voltage potential source; and
   an output taken from the second and third electrodes of said amplifying device.

2. A high speed saturating OR-inverter circuit as set forth in claim 1 wherein:
   said plurality of switching devices comprises a plurality of diodes having controlled recovery charge characteristics.

3. A high speed saturating OR-inverter circuit as set forth in claim 2 wherein:
   said inverter network switching device comprises a transistor having base, emitter and collector electrodes corresponding, respectively to said first, second and third electrodes.

4. A high speed saturating OR-inverter circuit as set forth in claim 3 wherein:
   said first energy-storing network comprises a capacitor and resistor in parallel.

5. A high speed saturating OR-inverter circuit as set forth in claim 4 wherein:
said amplifying device comprises a transistor having base, emitter and collector electrodes corresponding, respectively, to said first, second and third electrodes.

6. A high speed saturating OR-inverter circuit as set forth in claim 5 wherein:
said second energy-storing network comprises an inductor and resistor in series.

7. A high speed saturating OR-inverter circuit as set forth in claim 6 further including:
a diode connected between the base and emitter of said amplifying transistor and wherein said output is taken from said emitter and, through a capacitor, from said collector.

8. A high speed saturating OR-inverter circuit as set forth in claim 7 further including:
a third energy-storing network comprising an inductor and resistor in series connected between the base electrode of said amplifying transistor and a source of voltage potential.

9. A high speed saturating OR-inverter circuit comprising:
an OR-gate network;
an inverter network connected to said OR-gate network; and
an output network connected to said inverter network;
said OR-gate network comprising:
a plurality of switching devices each having a first and a second terminal;
said first terminals being connected to transmission lines carrying logic voltage pulses;
said switching devices being connected in common at their respective second terminals at a junction point;
said inverter network comprising:
a switching device having first, second and third electrodes;
said first electrode being connected to said junction point through a resistor;
said third electrode being connected thru a two terminal switching device to a source of voltage potential;
said output network comprising:
an amplifying device having first, second and third electrodes;
said third electrode of said switching device being connected to said first electrode of said amplifying device;

a first energy-storing network connected between the first electrode of said switching device and a source of voltage potential;
the second electrode of said amplifying device being connected to said source of voltage potential;
a second energy-storing network connected between the first electrode of said amplifying device and a source of voltage potential; and
an output taken from the second and third electrodes of said amplifying device.

10. A high speed saturating OR-inverter circuit as set forth in claim 9 wherein:
said plurality of switching devices comprises a plurality of diodes having controlled recovery change characteristics.

11. A high speed saturating OR-inverter circuit as set forth in claim 10 wherein:
said inverter network switching device comprises a transistor having base, emitter and collector electrodes corresponding, respectively, to said first, second and third electrodes; and
said amplifying device comprises a transistor having base, emitter and collector electrodes corresponding, respectively, to said first, second and third electrodes.

12. A high speed saturating OR-inverter circuit as set forth in claim 11 wherein:
said first and second energy-storing devices each comprise an inductor and resistor in series.

13. A high speed saturating OR-inverter circuit as set forth in claim 12 further including:
a diode connected between the base and emitter of said amplifying transistor and wherein said output is taken from said emitter and, through a capacitor, from said collector.

References Cited by the Examiner

UNITED STATES PATENTS

| | | | |
|---|---|---|---|
| 3,191,075 | 6/1965 | Smythe. | |
| 3,201,600 | 8/1965 | Cosby | 307—88.5 |
| 3,204,122 | 8/1965 | Ih | 307—88.5 |
| 3,221,182 | 11/1965 | Anderson et al. | 307—88.5 |

ARTHUR GAUSS, *Primary Examiner.*

I. C. EDELL, R. EPSTEIN, *Assistant Examiners.*